United States Patent [19]

Traitler et al.

[11] Patent Number: 5,264,237
[45] Date of Patent: Nov. 23, 1993

[54] HYPOCALORIC FOOD COMPOSITION

[75] Inventors: Helmut Traitler, Corseaux; Heike Winter, Vevey, both of Switzerland

[73] Assignee: Nestec S.A., Vevey, Switzerland

[21] Appl. No.: 711,188

[22] Filed: Jun. 5, 1991

[30] Foreign Application Priority Data

Jul. 9, 1990 [EP] European Pat. Off. ........ 90113045.0

[51] Int. Cl.$^5$ .............................................. A23D 9/00
[52] U.S. Cl. .................................. 426/611; 426/601; 426/804
[58] Field of Search ................ 426/601, 611, 531, 804

[56] References Cited

U.S. PATENT DOCUMENTS

| | | | |
|---|---|---|---|
| 3,600,186 | 8/1971 | Mattson et al. | 426/601 |
| 5,006,351 | 4/1991 | Klemann | 426/804 |
| 5,008,126 | 4/1991 | Klemann | 426/611 |
| 5,043,179 | 8/1991 | Klemann | 426/611 |
| 5,188,858 | 2/1993 | Stipp | 426/804 |

FOREIGN PATENT DOCUMENTS 0161114 11/1985 European Pat. Off. .
405874 1/1991 European Pat. Off. .

OTHER PUBLICATIONS

Mattson, et al., "Hydrolysis of fully esterified alcohols containing from one to eight hydroxyl groups by the lipolytic enzymes of rat pancreatic juice" Journal of Lipid Research 1972 vol. 13 pp. 325-328.
Wille, et al. "Wiederveresterung von Konzentraten mehrfach ungesättigter Fettsäuren". *Fat Sci. Technol.* 89 (12):1987, pp. 480-485 (with Translation).

Primary Examiner—Carolyn Paden
Attorney, Agent, or Firm—Vogt & O'Donnell

[57] ABSTRACT

Food compositions are prepared by incorporating in a food a diester or triester of fatty acids and an aliphatic $C_{4-5}$ diol or triol having secondary alcohol functions. Fried foods may be prepared by frying the food in the presence of the diester or triester.

26 Claims, No Drawings

HYPOCALORIC FOOD COMPOSITION

BACKGROUND OF THE INVENTION

This invention relates to a hypocaloric food composition containing lipids in which the lipids are at least partly replaced by a caloric moderator consisting of a polyol ester other than glycerol and fatty acid.

Nutrition in the developed countries is characterized by an excessive consumption of fats which represent the richest nutriments from the point of view of energy. This excessive consumption involves all manner of health risks, above all cardiovascular risks. In addition, certain anomalies of the lipid metabolism, such as hyperlipidemia, obesity, and diabetes, require not only therapeutic treatment, but also the application of diets which reduce the quantities of fats, particularly saturated fats, and cholesterol ingested.

However, the fats have other extremely important technical, i.e. non-nutritive, functions by virtue of their particular physical properties and contribute towards the texture and flavour of most foods. Well-established eating habits prohibit any reduction in their consumption despite the risks involved because the produce a feeling of fullness.

For this reason, attempts have been made to replace natural fats in foods by synthetic pseudo-fats which have their physicochemical and organoleptic characteristics, but are not metabolized by the organism. A preferred class of these compounds consists of polyol esters other than glycerol already present in natural foods. Pseudo-fats such as these are hydrolyzed only slightly, if at all, by the gastrointestinal hydrolases, so that they are split up and resorbed only slightly, if at all, and instead are eliminated with the faeces and, basically, do not present any toxicity problems. The sugar esters of fatty acids, for example, represent pseudo-fats of the type in question which are suitable for use in the hypocaloric food compositions described, for example, in U.S. Pat. No. 3,600,168. However, the sugar esters have the disadvantage of being relatively expensive because their synthesis is complicated. In addition, it has been found that they affect the intestinal transit to the extent of causing diarrhoea.

SUMMARY OF THE INVENTION

Applicants have found that esters of fatty acids and polyols other than glycerol present in small quantities in the tissue lipids, particularly of marine animals, and in the grains of certain cereals have the remarkable property that they are hardly hydrolyzed by the gastrointestinal hydrolases in in vitro tests and are hardly absorbed in in vivo tests based on the ingestion of diets containing them. In addition, in the in vivo tests, no intolerance or disturbance of the intestinal transit was observed.

Structurally similar compounds are generally described as plant growth regulators in European Patent Application 0 161 114. The esters of 2-methyl-1,4-butanediol and 1,3-propanediol with oleic, linoleic and linolenic acids are mentioned in particular.

The food composition according to the invention is characterized in that the caloric moderator is a diester or triester of a fatty acid and an aliphatic $C_{3-5}$ polyol containing at least one esterified secondary alcohol function and at most one esterified primary alcohol function.

The aliphatic polyol is preferably selected from the polyols known for their harmlessness which are present in the lipid part of the animal or vegetable starting materials containing them. 1,2-Propanediol, 1,3-butanediol and 2,3-butanediol are mentioned by way of example.

Within this category, preference is attributed to a polyol provided with secondary alcohol functions, i.e. having no primary alcohol function. This is because it has been found that hydrolysis by the lipases is preferentially centered on the primary alcohol esters, so that the rate of absorption of the caloric moderator is proportional to the ratio between primary and secondary alcohol. For example, 2,3-butanediol is preferred because its esters are hardly absorbed.

The nature of the fatty acid(s) is dictated by the desired physicochemical properties of the caloric moderator within the context of a given application. In this regard, the caloric moderator should be compatible with the lipids which it is intended to replace, i.e. should preferably comprise the same fatty acids advantageously in the same proportions as the said lipids. The fatty acids used are preferably $C_{16-22}$ fatty acids.

DETAILED DESCRIPTION OF THE INVENTION

The food composition according to the invention may be an oil-in-water or water-in-oil emulsion. Suitable oil-in-water emulsions include reconstituted milk, ice creams, mayonnaises, salad dressings, etc. Water-in-oil emulsions include savory or sweetened filling or spreading pastes, margarines, meat emulsions, coffee "creamers" or confectioner's custard.

An emulsion may be in liquid, paste-like (semisolid) or solid form, i.e. in the last case dried and reconstitutable with water, for example in the case of a whole milk or a coffee creamer. An emulsion of the type in question may be gelled, for example in the case of acidified milks, yoghurts and desserts. The composition may be a dispersion of solid particles in the fat, such as for example coating pastes and chocolate.

The fats content of a composition is generally in the range from 10 to 90% by weight. The caloric moderator may make up 10 to 100% by weight of the lipid phase, depending on the caloric moderator effect which it is desired to obtain. It has in effect which it is desired to obtain. It has in effect been found that the rate of absorption of a mixture of the caloric moderator and a fat is inversely proportional to the content of the caloric moderator in the mixture.

In certain applications, for example as frying oil, the caloric moderator may be used on its own or in admixture with an oil. In this particular application, the excellent stability of the caloric moderator to hydrolysis and to heat treatment represent a very significant advantage.

The level of incorporation of the caloric moderator is advantageously from 10 to 90% by weight of the lipid mixture for the lactic fats and vegetable oils commonly used.

One particular application is the partial replacement of cocoa butter or lactic fats in chocolate or filling or coating pastes. In this case, the level of incorporation compatible with the physicochemical properties of cocoa butter is from 10 to 15% by weight, based on the cocoa butter, in the case of chocolate or up to 100% in the case of filling or coating pastes.

The caloric moderator may be prepared in known manner by chemical esterification of the polyol with the fatty acid or fatty acid mixture in the absence of an organic solvent, this method having been applied to the re-esterification of fatty acids with glycerol described, for example, in Fat. Sci. Technol. 89, 480–485. The esterification reaction takes place in a reactor equipped with a stirrer, with means for keeping the temperature at a value close to the reflux temperature of the mixture of reactants and with means for removing the water of reaction by distillation. The reaction is carried out in the presence of a catalyst, for example zinc chloride, with a slight excess of polyol over a period of 2 to 4 h at 150° to 170° C. A vacuum of 2.7 to 27 mb (2 to 20 mm Hg) is then applied and distillation is continued for 1 to 3 h.

After cooling to ambient temperature, the mixture is taken up in a solvent, for example hexane, and the zinc chloride is separated by filtration. The product obtained may then be purified by chromatography, for example on alumina. Alternatively, the mixture is directly subjected, i.e. without being taken up in a solvent, to refining without degumming, i.e. by neutralization, decoloration, evaporation of the solvent and, finally, deodorization.

In a variant of the synthesis, the esterification may be carried out in a known manner by the enzymatic method using a non-specific lipase, for example of yeast. A lipase of candida cylindracea, for example, may thus be used. This is done by a batch process in which the fatty acids are dissolved in a hydrocarbon, for example n-heptane or n-hexane, for example in a concentration by weight of 2 to 10%. The polyol is mixed with approximately 10% water containing an excess of enzyme in relation to the fatty acids, for example approximately 3 parts by weight enzyme to 2 parts by weight fatty acid. The aqueous phase (pH approx. 7.2) and organic phase are introduced with vigorous stirring at a temperature of 20° to 55° C. and preferably at a temperature of 40° to 45° C. The reaction—in heterogeneous medium—takes place at the interface between the two phases and is displaced towards the formation of ester because the ester passes into the organic phase as it is produced.

In one preferred continuous variant of this enzymatic synthesis, the reactants may be introduced into an enzyme immobilized, for example, on resin, silica or cloth in a reactor which enables a smaller quantity of enzyme to be used.

The caloric moderator may advantageously be protected against oxidation by incorporation of an antioxidant, preferably a liposoluble antioxidant, for example a tocopherol or ascorbyl palmitate.

Finally, the present invention relates to a process for the production of a hypocaloric food, characterized in that a caloric moderator of the type defined above is incorporated in the food.

In one particular application intended for the production of a fried food, for example potatoes, noodles, meat or breaded fish, a vegetable or fruit coated with a frying mix, the process is characterized in that the food is fried in the presence of a caloric moderator of the type defined above.

EXAMPLES

The invention is illustrated by the following Examples in which parts and percentages are by weight, unless otherwise stated.

EXAMPLE 1

56.4 g of a mixture of fatty acids containing:

|  | % |
| --- | --- |
| oleic acid | 70 |
| stearic acid | 10 |
| palmitic acid | 10 |
| linoleic acid | 5 |
| myristic, palmitoleic and arachic acids | 5 | are mixed with 0.56 g zinc chloride in a reactor equipped with a stirrer and the mixture is heated with stirring to 160° C. The reactor is purged with nitrogen during the heating phase. 9 g 2,3-butanediol in racemate form are then gradually added with stirring. The reactor is provided with a descending condenser kept at 15° C. by circulation of cold water. After a reaction time of 3 h at 160° C., a vacuum of 5 mb is applied and the water is continuously eliminated with the remaining 2,3-butanediol by evaporation over a period of 2 h. After purification of the liquid obtained by passage of a 1:1 solution in hexane over a column of aluminium oxide, a purified ester containing approximately 0.2% free fatty acids is collected: refractive index 1.4635 at 20° C., viscosity 49 mPa.s at 20° C. and density 0.895 (g/cm$^3$) at 22.4° C.

The purified product, which is pale yellow in colour, is odourless and behaves like a neutral vegetable oil, for example sunflower oil, from the point of view of its physical properties, particularly its stability to heat.

EXAMPLE 2

2 Mol of the fatty acid mixture used in Example 1 are heated with 1% zinc chloride with stirring at 160° C. and 1.15 mol 2,3-butanediol (racemate) are gradually added. The mixture is left to react at that temperature for 3 h, during which the water formed is continuously removed in the form of steam. A vacuum of 13 mb (10 mm Hg) is then applied and the reaction is continued under these conditions for 2 h. After cooling to ambient temperature, the zinc chloride is separated by filtration. After neutralization, decoloration and, finally, deodorization, a pale yellow, odourless and tasteless product is collected, its physical properties being comparable with those of a neutral oil.

EXAMPLE 3

The procedure is as in Example 2, 2,3-butanediol (racemate) being reacted with the following mixture of fatty acids:

|  | % |
| --- | --- |
| lauric acid | 13 |
| stearic acid | 33 |
| palmitic acid | 23 |
| oleic acid | 28 |
| other acids | 3 |

The product obtained is solid at ambient temperature (20° C.).

It behaves similarly to cocoa butter from the point of view of its melting characteristics, as can be seen by studying the solid fat index (SFI) obtained by determination of the melting curve. Thus, the SFI—the percentage of solid "fat" existing in the "fatty substance" partially melted at a given temperature, determined by pulsed NMR (nuclear magnetic resonance of the proton), cf. I.U.P.A.C., 1st Supplement, 1982, method 2.323—is shown in the following table by comparison with that of cocoa butter:

| SFI (%) | Temperature (°C.) | | | | | |
|---|---|---|---|---|---|---|
| | 5 | 10 | 20 | 30 | 37 | 40 |
| Product of Example 2 | 73 | 68 | 63 | 48 | 12 | 5 |
| Cocoa butter | 85 | 82 | 73 | 40 | 8 | 0 |

EXAMPLE 4

4.1 Study of the Ingestion of a Diet Containing the Caloric Moderator in Obese Rats

4.1.1 Experimental Conditions

9 Male rats 8 weeks old are divided into two groups of 4 and 5 taken at random, but in such a way that the average initial weights in each group are equal. The two groups are fed at will on a standard diet in which 10% of the diet is replaced by (A) cornseed oil and (B) the product of Example 2 over a period of 35 days.

The rats are weighed twice weekly on days 3 and 7 and their hair, their anus, their faeces and their behaviour are observed.

The diet supplied and the remaining diet are weighted after each ingestion (the diet eaten is obtained by subtraction) and the ration is renewed at regular intervals, still using the same quantity. The cumulated ingestion diet per animal is then determined.

After 5 weeks, the animals are killed, their blood is collected and the plasma is separated. The heart and liver are removed, washed and immediately frozen, the organs then being stored at −40° C. pending analysis.

4.1.2 Results

The results relating to the development of the weights are shown in Table 1:

TABLE 1

| | Group | | | | | | Differ- |
|---|---|---|---|---|---|---|---|
| | A | | | B | | | ence in |
| Day | Average weight increase (g) | Average weight (g) | Average cumulated ingested diet (g) | Average weight increase (g) | Average weight (g) | Average cumulated ingested diet (g) | weight increase A-B (g) |
| 0 | 0 | 249 | 0 | 0 | 249 | 0 | 0 |
| 3 | 27 | 276 | 83.6 | 22 | 271 | 85.7 | 5 |
| 7 | 62 | 311 | 203.8 | 54 | 303 | 213.2 | 8 |
| 10 | 88.6 | 337.6 | 291.8 | 75.1 | 324.1 | 301.5 | 13.5 |
| 14 | 122 | 371 | 416.7 | 102.5 | 351.5 | 423.5 | 19.5 |
| 17 | 143.3 | 392.3 | 501.2 | 116.2 | 365.2 | 508.3 | 27.1 |
| 21 | 169.5 | 418.5 | 618.3 | 137.4 | 386.4 | 622.9 | 32.1 |
| 24 | 188.4 | 437.4 | 705.4 | 148.3 | 397.3 | 704.6 | 40.1 |
| 28 | 209.9 | 458.1 | 827.8 | 166.4 | 415.4 | 824 | 43.5 |
| 31 | 224.3 | 473.3 | 917.4 | 174.4 | 423.4 | 918.8 | 49.9 |
| 35 | 247.2 | 496.2 | 1033.6 | 191.6 | 440.6 | 1031.4 | 55.6 |

A distinct difference in weight increase is observed from the beginning of the regime between group A (diet containing cornseed oil) and group B (diet containing the caloric moderator), group A growing larger distinctly more quickly than group B.

The diet of group B contained approximately 6% digestible fats, including 17% linoleic acid and 1.8% α-linolenic acid. These values are standard for typical laboratory diets and are considered to be sufficient for avoiding lipid deficiencies in rats.

The faster growth of group A continued throughout the experiment and resulted in a difference in the weight increase of 22.5% between the two groups and in a total weight difference of 11.2%.

The energy difference between the two diets, based on metabolizable energy of 3.16 kcal/g for the standard diet, represents 24% assuming that the calorie input of the caloric moderator is zero. This is in almost perfect accordance with the observed difference in weight increase of 22.5%. This shows that the caloric moderator in group B is not metabolized and that its caloric contribution is substantially zero.

So far as the taking of food is concerned, there is no significant difference between the quantities ingested in the two groups throughout the study. The slight difference observed represented 2.2 g for group B out of more than 1,000 g total average intake per animal, i.e. 0.2%.

The results suggest that there is no preference for or rejection of either diet for organoleptic reasons and that the fact that the diet of group B has a lower caloric density does not lead the animals to eat more by way of compensation, but that the presence of the moderator gives them the same feeling of fullness as, for example, the cornseed oil of the diet of group A. These observations remained valid for the entire duration of the regime. There was no major change in the eating habits of the animals in the two groups.

Finally, no abnormal phenomenon was observed in any of the animals. The animals of the two groups had dry, non-greasy hair, a non-greasy anus and consistent stools with no sign of diarrhoea. The stools of group B were greasy, but hard. Accordingly, it appeared that no disturbing effect on the intestinal transit could be attributed to the caloric regulator.

Analysis of the tissue lipids of the hearts and livers revealed no trace of unmodified diol ester accumulated in the organs. The two groups showed the presence of small quantities of the diol esters which are normally observed in the liver.

4.2 Study of the Ingestion of the Caloric Moderator in Normal Mice

5 Young female mice receiving a standard diet and water at will were fed with 20 ml of the product of Example 1 per kg bodyweight by cramming in a single dose. The animals were weighed on days 1, 2, 3, 4, 5, 8, 12 and 15.

Observation of the animals showed no toxicity, mortality or abnormal behaviour. The anal part of the animals became greasy 1.5 h after administration of the product, although this phenomenon did disappear after 24 h. The weight increase was approximately 10% in 15 days.

EXAMPLE 5

Hypocaloric Mayonnaise

Two formulations of the "mayonnaise" type (oil in water) having the compositions indicated in columns (A), (B) and (C) below are prepared. The products have comparable organoleptic characteristics, but very different caloric values

|  | (A) | (B) | (C) |
|---|---|---|---|
| Sunflower oil | 81 | 41 | — |
| Liquid 2,3-butanediol ester of Example 2 | — | 40 | 81 |
| Egg yolk | 5 | 5 | 5 |
| Vinegar | 4 | 4 | 4 |
| Salt | 1.5 | 1.5 | 1.5 |
| Sugar | 1.5 | 1.5 | 1.5 |
| Flavourings | 0.8 | 0.8 | 0.8 |
| Water qsf 100 | — | — | — |
| Kcal/100 g | 780 | 422 | 53 |
| KJ/100 g | 3,270 | 1,770 | 222 |

EXAMPLE 6

Hypocaloric Salad Dressing

Salad dressings (oil-in-water emulsions of which the aqueous phase contains vinegar) are prepared, starch being used as thickener.

The compositions shown in columns (D), (E) and (F) below illustrate the reduction in caloric value obtained by using the caloric moderator.

|  | (D) | (E) | (F) |
|---|---|---|---|
| Sunflower oil | 42 | 20 | — |
| Liquid 2,3-butanediol ester of Example 2 | — | 22 | 42 |
| Egg yolk | 5 | 5 | 5 |
| Salt | 4 | 4 | 4 |
| Sugar | 3 | 3 | 3 |
| Starch | 9 | 9 | 9 |
| Vinegar | 15 | 15 | 15 |
| Spices | 3 | 3 | 3 |
| Water qsf 100 | — | — | — |
| Kcal/100 g | 473 | 274 | 94 |
| KJ/100 g | 1,985 | 1,150 | 394 |

EXAMPLE 7

Hypocaloric Chocolate

The 2,3-butanediol ester—solid at ambient temperature—of Example 3 is mixed with cocoa butter and/or cocoa butter substitutes in the quantities shown below to produce chocolate or coatings having the same physical and organoleptic characteristics, but a reduced caloric content, for the chocolate compositions (G), (H) and (I) shown below:

|  | (G) | (H) | (I) |
|---|---|---|---|
| Cocoa solids (fats 55%) | 32.8* | 32.8* | 32.8* |
| Sucrose | 48.3 | 48.3 | 48.3 |
| Cocoa butter | 19.2 | 12 | — |
| 2,3-Butanediol ester of Example 3 | — | 7.2 | 19.2 |
| Soya lecithin | 0.3 | 0.3 | 0.3 |
| Flavourings | Traces | Traces | Traces |
| Kcal/100 g | 560 | 495 | 387 |
| KJ/100 g | 2,350 | 2,070 | 1,621 |

*corresponds to 30 dry matter

If, in composition I, the sucrose is replaced by a sugar (PALATINIT ®, an acariogenic concentrated sweetener of reduced energy value consisting of a mixture of glucosyl sorbitol and glucosyl mannitol, supplying 50% of the calories of the product), the chocolate obtained has a caloric value of 190 Kcal or 1215 KJ/100 g.

We claim:

1. A process for preparing a lipid-containing food composition comprising incorporating in a food a caloric moderator selected from the group consisting of diesters of fatty acids and 2,3-butanediol.

2. A process according to claim 1 wherein the caloric moderator in incorporated in the food in an amount such that it comprises from 10% to 100% by weight of a lipid phase of the food.

3. A process according to claim 1 wherein the caloric moderator is a diester of 2,3-butanediol and a $C_{16-22}$ fatty acid.

4. A process according to claim 1 wherein the caloric moderator is a diester of 2,3-butanediol and a fatty acid mixture containing oleic acid, palmitic acid, stearic acid and linoleic acid.

5. A process according to claim 1 wherein the food composition contains cocoa butter.

6. A process according to claim 5 wherein the caloric moderator is incorporated in the food in an amount such that it comprises from 10% to 15% by weight of the weight of cocoa butter.

7. A process according to claim 6 wherein the caloric moderator is a diester of 2,3-butanediol and a fatty acid mixture containing lauric acid, stearic acid, palmitic acid and oleic acid.

8. A process for preparing a fried food comprising frying a food in the presence of a caloric moderator selected from the group consisting of diesters of fatty acids and 2,3-butanediol.

9. A process according to claim 8 wherein the diester of 2,3-butanediol is in admixture with an oil.

10. A fried food obtained by the process of claim 8.

11. A fried food obtained by the process of claim 9.

12. A lipid-containing food composition comprising a food and a caloric moderator selected from the group consisting of diesters of fatty acids and 2,3-butanediol.

13. A food composition according to claim 12 wherein the caloric moderator is in an amount of from 10% to 100% by weight of a lipid phase of the food.

14. A food composition according to claim 12 wherein the caloric moderator is a diester of 2,3-butanediol and a $C_{16-22}$ fatty acid.

15. A food composition according to claim 12 wherein the caloric moderator is a diester of 2,3-butanediol and a fatty acid mixture containing oleic acid, palmitic acid, stearic acid and linoleic acid.

16. A food composition according to claim 12 which is a liquid oil-in-water emulsion.

17. A food composition according to claim 16 wherein the oil-in-water emulsion is a mayonnaise.

18. A food composition according to claim 16 wherein the oil-in-water emulsion is a salad dressing.

19. A food composition according to claim 12 which is a solid or semisolid water-in-oil emulsion.

20. A food composition according to claim 19 wherein the water-in-oil emulsion is a margarine, a spreading paste or a shortening.

21. A food composition according to claim 12 which is an ice cream.

22. A food composition according to claim 12 which is a solid dispersion.

23. A food composition according to claim 22 wherein the solid dispersion is a chocolate.

24. A food composition according to claim 23 wherein the chocolate contains cocoa butter and the caloric moderator is present in an amount of from 10% to 15% by weight based on the weight of the cocoa butter.

25. A food composition according to claim 24 wherein the caloric moderator is a diester of 2,3-butanediol and a fatty acid mixture containing lauric acid, stearic acid, palmitic acid and oleic acid.

26. A frying oil composition comprising oil and a caloric moderator selected from the group of diesters of fatty acids and 2,3-butanediol.

* * * * *

UNITED STATES PATENT AND TRADEMARK OFFICE
CERTIFICATE OF CORRECTION

PATENT NO. : 5,264,237
DATED : November 23, 1993
INVENTOR(S) : Helmut TRAITLER, et al.

It is certified that error appears in the above-identified patent and that said Letters Patent is hereby corrected as shown below:

Column 8, line 21 (line 1 of claim 2), "in" should be --is--.

Signed and Sealed this

Seventh Day of June, 1994

Attest:

BRUCE LEHMAN

Attesting Officer        Commissioner of Patents and Trademarks